United States Patent
Alameldeen et al.

(10) Patent No.: US 10,048,868 B2
(45) Date of Patent: Aug. 14, 2018

(54) REPLACEMENT OF A BLOCK WITH A COMPRESSED BLOCK TO INCREASE CAPACITY OF A MEMORY-SIDE CACHE

(71) Applicant: Intel Corporation, Santa Clara, CA (US)

(72) Inventors: Alaa R. Alameldeen, Hillsboro, OR (US); Glenn J. Hinton, Portland, OR (US); Blaise Fanning, Folsom, CA (US); James J. Greensky, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 15/279,647

(22) Filed: Sep. 29, 2016

(65) Prior Publication Data

US 2018/0088822 A1    Mar. 29, 2018

(51) Int. Cl.
| | | |
|---|---|---|
| *G06F 12/00* | (2006.01) | |
| *G06F 3/06* | (2006.01) | |
| *G06F 12/0873* | (2016.01) | |
| *G06F 12/12* | (2016.01) | |

(52) U.S. Cl.
CPC ............ *G06F 3/0608* (2013.01); *G06F 3/064* (2013.01); *G06F 3/0661* (2013.01); *G06F 3/0673* (2013.01); *G06F 12/0873* (2013.01); *G06F 12/12* (2013.01); *G06F 2212/1044* (2013.01); *G06F 2212/281* (2013.01); *G06F 2212/305* (2013.01); *G06F 2212/3042* (2013.01); *G06F 2212/401* (2013.01); *G06F 2212/69* (2013.01)

(58) Field of Classification Search
CPC .... G06F 12/0811; G06F 3/0608; G06F 12/12; G06F 12/0873; G06F 3/0673; G06F 3/0661; G06F 3/064; G06F 2212/305; G06F 2212/3042; G06F 2212/401; G06F 2212/281; G06F 2212/69; G06F 2212/104
USPC ................... 711/133, 122; 710/68; 709/247; 707/693
See application file for complete search history.

(56) References Cited

U.S. PATENT DOCUMENTS 8,612,676 B2    12/2013 Dahlen et al.
2005/0144387 A1    6/2005 Adl-Tabatabai et al.
(Continued)

FOREIGN PATENT DOCUMENTS

WO    2015160362 A    10/2015

OTHER PUBLICATIONS

International Search Report and Written Opinion for International Patent Application No. PCT/US2017/048457, dated Dec. 13, 2017, 11 pages.

*Primary Examiner* — Hong Kim
(74) *Attorney, Agent, or Firm* — Jordan IP Law, LLC (57) ABSTRACT

Systems, apparatuses and methods may provide for identifying a first block and a second block, wherein the first block includes a first plurality of cache lines, the second block includes a second plurality of cache lines, and the second block resides in a memory-side cache. Additionally, each cache line in the first plurality of cache lines may be compressed with a corresponding cache line in the second plurality of cache lines to obtain a compressed block that includes a third plurality of cache lines. In one example, the second block is replaced in the memory-side cache with the compressed block if the compressed block satisfies a size condition.

25 Claims, 7 Drawing Sheets

(56) References Cited

U.S. PATENT DOCUMENTS

| | | | |
|---|---|---|---|
| 2008/0282033 A1* | 11/2008 | Badi | G06F 9/30043 |
| | | | 711/117 |
| 2013/0185458 A1 | 7/2013 | Amit et al. | |
| 2013/0297883 A1 | 11/2013 | Steely, Jr. et al. | |
| 2014/0297938 A1* | 10/2014 | Puthiyedath | G06F 12/08 |
| | | | 711/105 |
| 2015/0100556 A1* | 4/2015 | Sekiguchi | H03M 7/30 |
| | | | 707/693 |
| 2015/0178214 A1 | 6/2015 | Alameldeen et al. | |
| 2015/0193342 A1* | 7/2015 | Ohara | G06F 12/0873 |
| | | | 711/120 |
| 2017/0147496 A1* | 5/2017 | Sasanka | G06F 12/0875 |
| 2017/0255561 A1* | 9/2017 | Alameldeen | G06F 12/0864 |
| 2018/0004659 A1* | 1/2018 | Greenspan | G06F 12/0802 |

* cited by examiner

FIG. 5

REPLACEMENT OF A BLOCK WITH A COMPRESSED BLOCK TO INCREASE CAPACITY OF A MEMORY-SIDE CACHE

TECHNICAL FIELD

Embodiments generally relate to memory structures.

BACKGROUND

Computing system memory architectures may be structured as various levels of host processor-side caches (e.g., level one/L1 cache, level 2/L2 cache, last level cache/LLC) and a system memory that includes a memory-side cache (e.g., "near memory") and additional memory (e.g., "far memory") that is slower to access than the memory-side cache. The processor-side cache may be organized into relatively small (e.g., 64 B) cache lines, whereas the memory-side cache may be organized into relatively large (e.g., 1 KB or 4 KB) blocks in order to reduce tag and metadata overhead. Thus, each 4 KB block in a memory-side cache might contain, for example, sixty-four of the 64 B processor-side cache lines.

When a search for data in the memory-side cache is unsuccessful (e.g., a cache miss occurs), a "victim" line may be selected in the memory-side cache for replacement (e.g., eviction) by the requested data, which may be retrieved from the far memory. Frequent misses in the memory-side cache may reduce performance and increase power consumption due to the retrieval of data from the relatively slow far memory. In order to reduce the likelihood of misses in the memory-side cache, each block of the memory-side cache may be compressed to make room for more data. Decompressing the memory-side cache on a block-by-block basis, however, may increase latency and overhead, particularly when the retrieved data is in the critical path of host processor read operations. Accordingly, conventional memory architectures may still exhibit suboptimal performance and/or power consumption.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
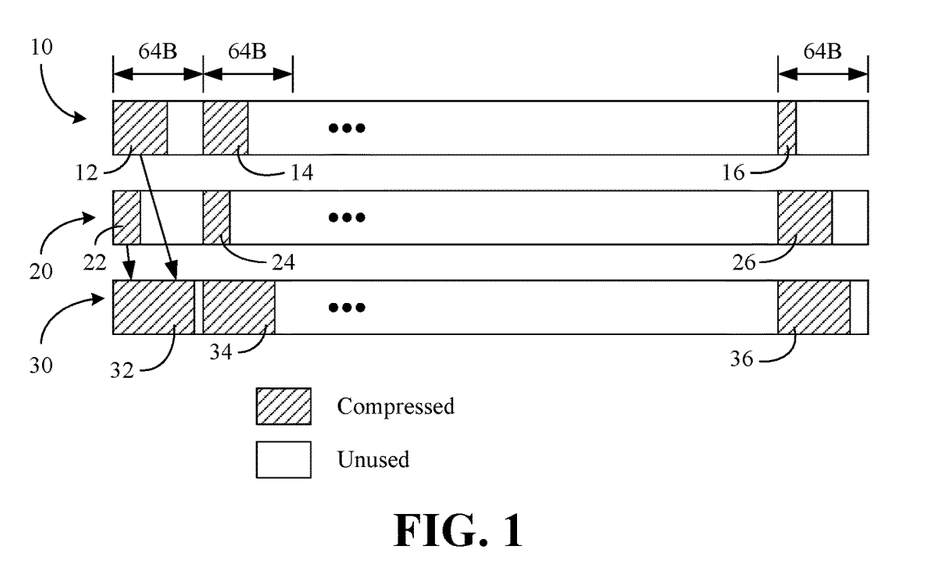
FIG. 1 is an illustration of an example of a compression scheme according to an embodiment.

Turning now to FIG. 1, a compression scheme is shown in which a first block 10 includes a first cache line that compresses to a first portion 12 of a total cache line size (e.g., 64 B), a second cache line that compresses to a second portion 14 of the total cache line size, an $n^{th}$ cache line that compresses to an $n^{th}$ portion 16 of the total cache line size, and so forth. In one example, the first block 10 may be referred to as a "fill block". The first block 10 may generally include data that is retrieved from far memory in response to a cache miss encountered in a memory-side cache (e.g., near memory). Thus, the illustrated first block 10 includes a plurality of cache lines, wherein the size of each cache line may equal the cache line size of one or more processor-side caches (e.g., LLC cache line size).

Similarly, a second block 20 may include a first cache line that compresses to a first portion 22 of the total cache line size, a second cache line that compresses to a second portion 24 of the total cache line size, an $n^{th}$ cache line that compresses to an $n^{th}$ portion 26 of the total cache line size, and so forth. In one example, the second block 20 may be referred to as a "partner block". In the illustrated example, each cache line in the first block 10 is compressed with the corresponding cache line in the second block 20 to obtain a compressed block 30. The compressed block 30 may therefore include a first cache line that occupies a first portion 32 of the total cache line size, a second cache line that occupies a second portion 34 of the total cache line size, an $n^{th}$ cache line that occupies an $n^{th}$ portion 36 of the total cache line size, and so forth. The compression procedure(s) used to generate the portions 12, 14, 16, 22, 24, 26, 32, 34, 36 may vary depending on the circumstances. Examples of compression techniques include frequent pattern compression (FPC), base-delta-immediate (BDI) compression, run length encoding (RLE), Cache Packer (CPACK), Huffman encoding, and Limpel-Ziv (LZ) compression.

The second block 20 may generally reside in the memory-side cache. For example, the second block 20 might be a victim block in the memory-side cache that is identified for eviction according to a least recently used (LRU) policy (or any other replacement policy). In such a case, the second block 20 (e.g., victim block) may be replaced by the compressed block 30 if the compressed block 30 satisfies a size condition. The size condition might specify that each cache line in the compressed block 30 has a size that is less than or equal to the cache line size associated with the processor-side cache (e.g., 64 B). Thus, the second block 20 may satisfy the size condition if the first portion 32 is less than or equal to 64 B, the second portion 34 is less than or equal to 64 B, the $n^{th}$ portion 36 is less than or equal to 64 B, etc., in the illustrated example.

In another example, the second block 20 may be the first encountered block (e.g., in time) in the memory-side cache to satisfy the size condition. Thus, if the size condition is satisfied, the second block 20 (e.g., first block to satisfy the condition) may be replaced by the compressed block 30. In yet another example, the second block 20 may be a "best fit" block in the memory-side cache that causes the compressed block 30 to leave the least amount of unused space. Other approaches to selecting the second block 20 may also be used.

Figure 2A:
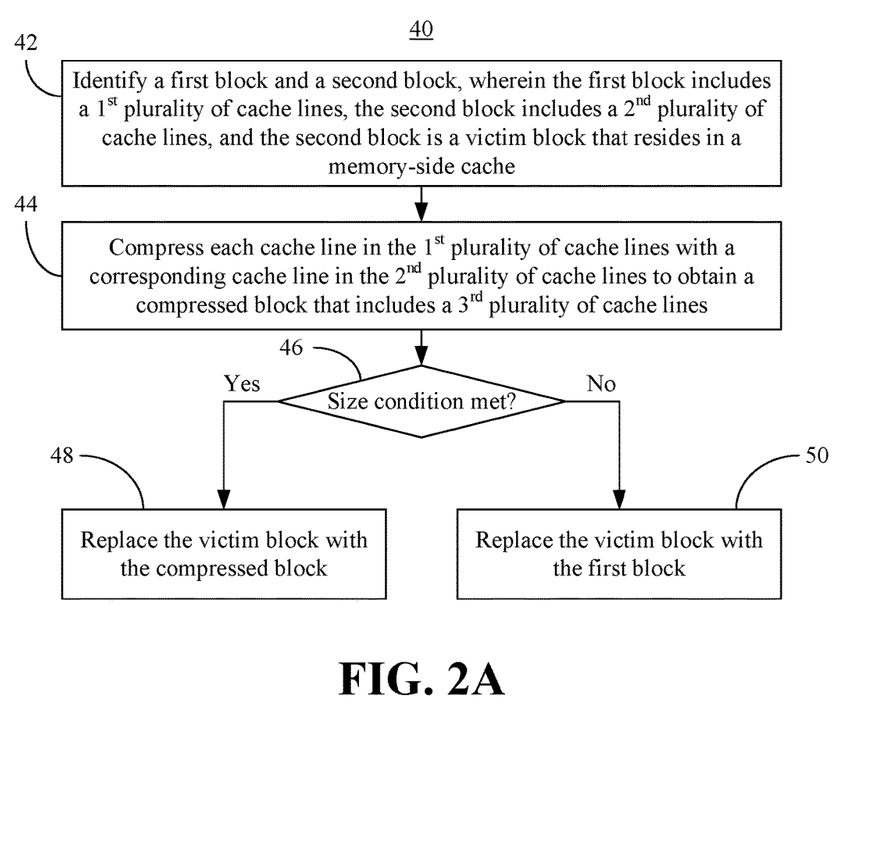
FIGS. 2A-2C are flowcharts of examples of methods of partnering memory-side cache blocks according to embodiments.

FIG. 2A shows a method 40 of partnering memory-side cache blocks. The method 40 may generally be implemented in a compression-enabled memory apparatus as described herein. More particularly, the method 40 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 42 provides for identifying a first block and a second block, wherein the first block includes a first plurality of cache lines, the second block includes a second plurality of cache lines, and the second block is a victim block that resides in a memory-side cache. Identification of the first block may include retrieving and/or receiving the first block from far memory in response to a cache miss in the memory-side cache. Moreover, identification of the second block may include selecting the victim block in accordance with an LRU or other suitable policy. Each cache line in the first plurality of cache lines may be compressed at processing block 44 with a corresponding cache line in the second plurality of cache lines to obtain a compressed block that includes a third plurality of cache lines. Processing block 44 may include, for example, applying one or more compression procedures to the first block and to the second block, and then combining the results on a cache line-by-cache line basis.

A determination may be made at processing block 46 as to whether the compressed block satisfies a size condition. As already noted, the size condition may include, for example, each cache line in the third plurality of cache lines having a size that is less than or equal to a cache line size associated with a processor-side cache. If the size condition is met, illustrated processing block 48 replaces the victim block with the compressed block. Accordingly, the illustrated method 40 enables a compressed version of the victim block to remain in the memory-side cache along with a compressed version of the first block. If it is determined at processing block 46 that the size condition is not met, processing block 50 may replace the victim block with the first block.

Figure 2B:
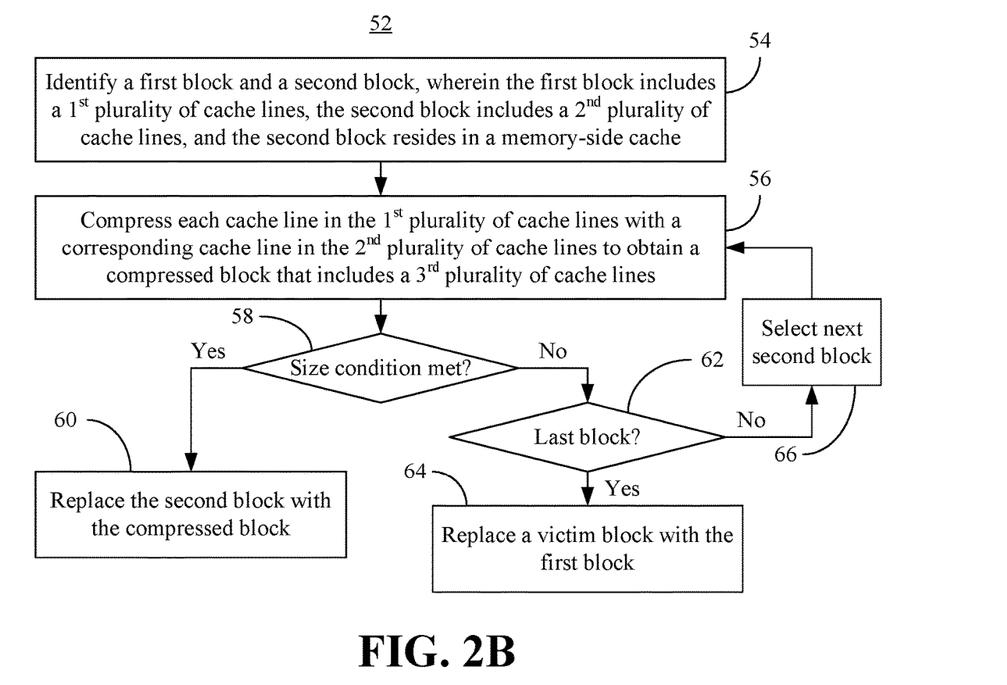

FIG. 2B shows another method 52 of partnering memory-side cache blocks. The method 52 may generally be implemented in a compression-enabled memory apparatus as described herein. More particularly, the method 52 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS, TTL technology, or any combination thereof.

Illustrated processing block 54 provides for identifying a first block and a second block, wherein the first block includes a first plurality of cache lines, the second block includes a second plurality of cache lines, and the second block resides in a memory-side cache. As already noted, identification of the first block may include retrieving and/or receiving the first block from far memory in response to a cache miss in the memory-side cache. Moreover, identification of the second block may include selecting a "candidate" from a given set in the memory-side cache (e.g., if the memory-side cache is a multi-way set associative cache, with each set containing multiple ways and each way containing a block of data). Each cache line in the first plurality of cache lines may be compressed at processing block 56 with a corresponding cache line in the second plurality of cache lines to obtain a compressed block that includes a third plurality of cache lines. Processing block 56 may include, for example, applying one or more compression procedures to the first block and to the second block, and then combining the results on a cache line-by-cache line basis.

A determination may be made at processing block 58 as to whether the compressed block satisfies a size condition, wherein the size condition may include, for example, each cache line in the third plurality of cache lines having a size that is less than or equal to a cache line size associated with a processor-side cache. If the size condition is met, illustrated processing block 60 replaces the second block with the compressed block. If, on the other hand, it is determined at processing block 58 that the size condition is not met, illustrated processing block 62 determines whether the last block (e.g., final block in the set) has been reached in the memory-side cache. If so, a victim block (e.g., according to LRU policy) may be replaced with the first block at processing block 64. If it is determined at processing block 62 that the last block has not been encountered, the next candidate second block may be selected at processing block 66 and the illustrated method 52 returns to processing block 56. Thus, the illustrated method 52 enables the compressed block to be substituted for the first encountered block in the memory-side cache to result in the compressed block satisfying the size condition.

Figure 2C:
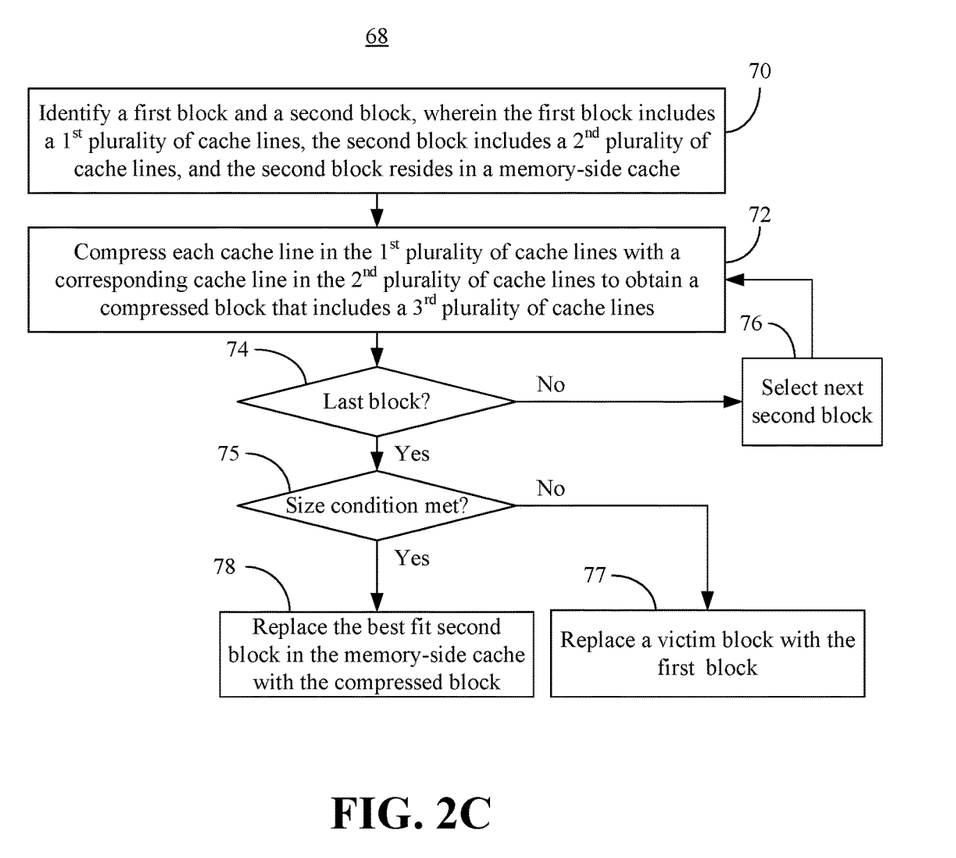

FIG. 2C shows yet another method 68 of partnering memory-side cache blocks. The method 68 may generally be implemented in a compression-enabled memory apparatus as described herein. More particularly, the method 68 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS, TTL technology, or any combination thereof Illustrated processing block 70 provides for identifying a first block and a second block, wherein the first block includes a first plurality of cache lines, the second block includes a second plurality of cache lines, and the second block resides in a memory-side cache. As already noted, identification of the first block may include retrieving and/or receiving the first block from far memory in response to a cache miss in the memory-side cache. Moreover, identification of the second block may include selecting a candidate from a given set in the memory-side cache (e.g., if the memory-side cache is a multi-way set associative cache, with each set containing multiple ways and each way containing a block of data). Each cache line in the first plurality of cache lines may be compressed at processing block 72 with a corresponding cache line in the second plurality of cache lines to obtain a compressed block that includes a third plurality of cache lines. Processing block 72 may include, for example, applying one or more compression procedures to the first block and to the second block, and then combining the results on a cache line-by-cache line basis.

Illustrated processing block 74 determines whether the last block (e.g., final block in the set) has been reached in the memory-side cache. If not, the next candidate second block may be selected at processing block 76 and the illustrated method 68 returns to processing block 72. Once it is determined at processing block 74 that the last block has been reached, a determination may be made at processing block 75 as to whether any blocks have satisfied a size condition. If so, processing block 78 may replace the best fit second block in the memory-side cache with the corresponding compressed block. The best fit second block may be considered the block that causes the compression block to leave the least amount of unused space in the memory-side cache. If it is determined at processing block 75 that no blocks have satisfied the size condition, illustrated processing block 77 replaces a victim block (e.g., according to LRU policy) with the first block.

Figure 3A:
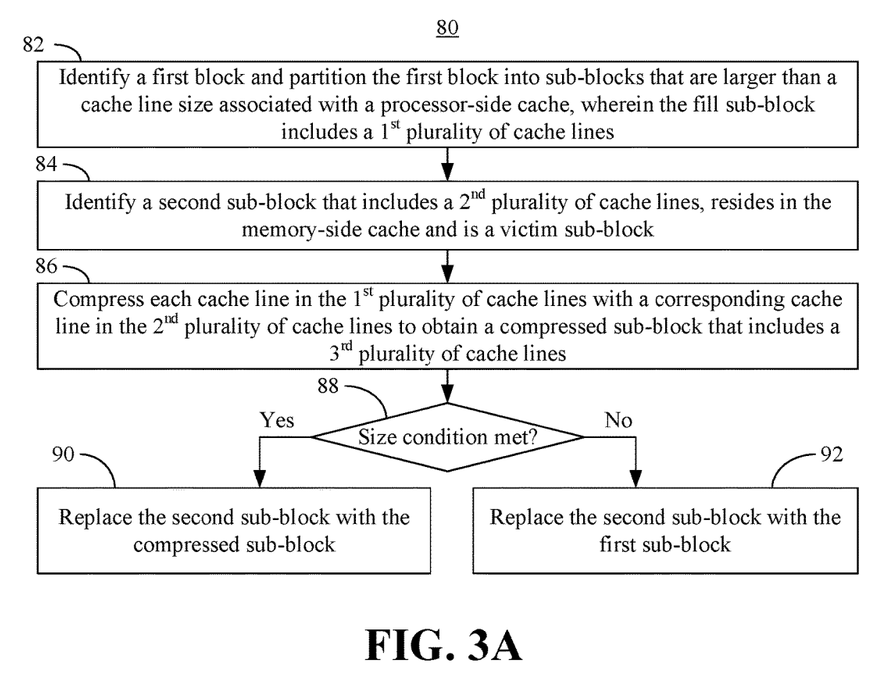
FIGS. 3A-3C are flowcharts of examples of methods of partnering memory-side cache sub-blocks according to embodiments.

FIG. 3A shows a method 80 of partnering memory-side cache sub-blocks. The method 80 may generally be implemented in a compression-enabled memory apparatus as described herein. More particularly, the method 80 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS, TTL technology, or any combination thereof.

Illustrated processing block 82 provides for identifying a first block and partitioning the first block into sub-blocks that are larger than a cache line size associated with a processor-side cache, wherein the fill sub-block includes a first plurality of cache lines. Thus, processing block 82 might include, for example, partitioning a 4 kB block of data into four 1 kB sub-blocks of data. Identification of the first block may include retrieving and/or receiving the first block from far memory in response to a cache miss in the memory-side cache. A partner sub-block may be identified at processing block 84, wherein the partner sub-block includes a second plurality of cache lines, and the partner sub-block is a victim sub-block that resides in a memory-side cache. Identification of the partner sub-block may include, for example, selecting the victim sub-block in accordance with an LRU or other suitable policy. Each cache line in the first plurality of cache lines may be compressed at processing block 86 with a corresponding cache line in the second plurality of cache lines to obtain a compressed sub-block that includes a third plurality of cache lines. Processing block 86 may include, for example, applying one or more compression procedures to the fill sub-block and to the partner sub-block, and then combining the results on a cache line-by-cache line basis.

A determination may be made at processing block 88 as to whether the compressed sub-block satisfies a size condition. As already noted, the size condition may include, for example, each cache line in the third plurality of cache lines having a size that is less than or equal to a cache line size associated with a processor-side cache. If the size condition is met, illustrated processing block 90 replaces the victim sub-block with the compressed sub-block. Accordingly, the illustrated method 80 enables a compressed version of the victim sub-block to remain in the memory-side cache along with a compressed version of the fill sub-block. Moreover, partitioning the first block into sub-blocks may increase/maximize the probability that a partner sub-block will be found for the fill sub-block. Indeed, any increase in compression metadata may be negligible in view of the performance and/or power consumption benefits associated with the probability increase. If it is determined at processing block 88 that the size condition is not met, processing block 92 may replace the victim sub-block with the fill sub-block.

Figure 3B:
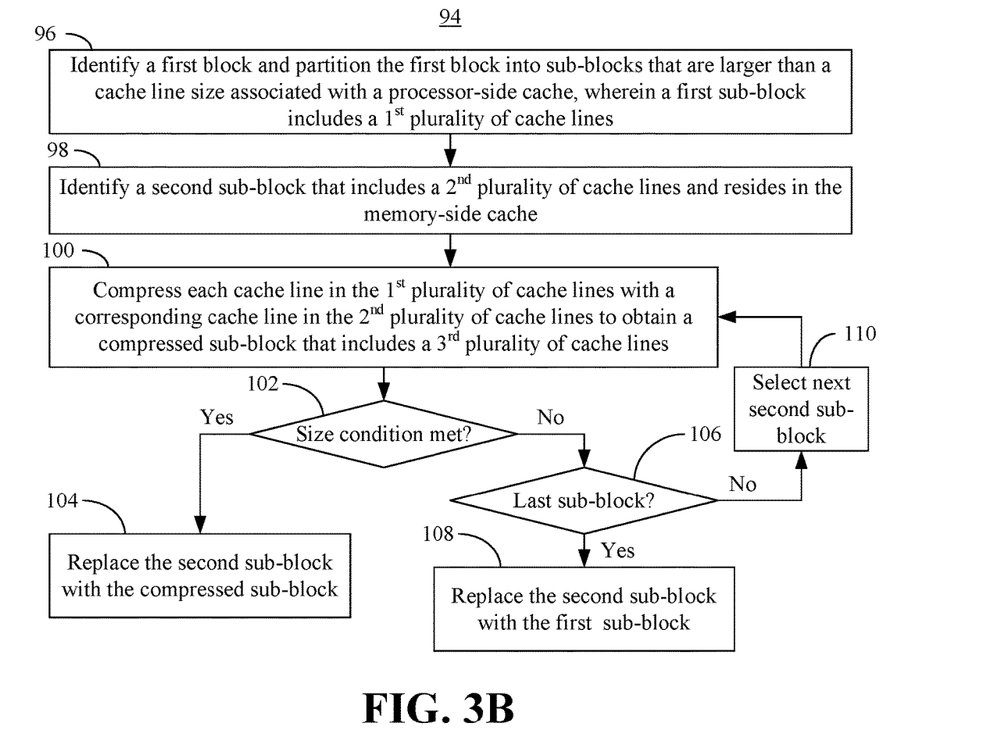

FIG. 3B shows another method 94 of partnering memory-side cache sub-blocks. The method 94 may generally be implemented in a compression-enabled memory apparatus as described herein. More particularly, the method 94 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS, TTL technology, or any combination thereof Illustrated processing block 96 provides for identifying a first block and partitioning the first block into sub-blocks that are larger than a cache line size associated with a processor-side cache, wherein the fill sub-block includes a first plurality of cache lines. Thus, processing block 96 might include, for example, partitioning a 4 kB block of data into four 1 kB sub-blocks of data, as already discussed. A partner sub-block may be identified at processing block 98, wherein the partner sub-block includes a second plurality of cache lines and resides in a memory-side cache. Identification of the partner sub-block may include selecting a "candidate" from a given set in the memory-side cache (e.g., if the memory-side cache is a multi-way set associative cache, with each set containing multiple ways and each way containing a block of data). Each cache line in the first plurality of cache lines may be compressed at processing block 100 with a corresponding cache line in the second plurality of cache lines to obtain a compressed sub-block that includes a third plurality of cache lines. Processing block 100 may include, for example, applying one or more compression procedures to the fill sub-block and to the partner sub-block, and then combining the results on a cache line-by-cache line basis.

A determination may be made at processing block 102 as to whether the compressed sub-block satisfies a size condition, wherein the size condition may include, for example, each cache line in the third plurality of cache lines having a size that is less than or equal to a cache line size associated with a processor-side cache. If the size condition is met, illustrated processing block 104 replaces the partner sub-block with the compressed sub-block. If, on the other hand, it is determined at processing block 102 that the size condition is not met, illustrated processing block 106 determines whether the last sub-block (e.g., final sub-block in the set) has been reached in the memory-side cache. If so, the partner sub-block may be replaced with the fill sub-block at processing block 108. If it is determined at processing block 106 that the last sub-block has not been encountered, the next candidate partner sub-block may be selected at processing block 110 and the illustrated method 94 returns to processing block 100. Thus, the illustrated method 94 enables the compressed sub-block to be substituted for the first encountered sub-block in the memory-side cache to result in the compressed sub-block satisfying the size condition.

Figure 3C:
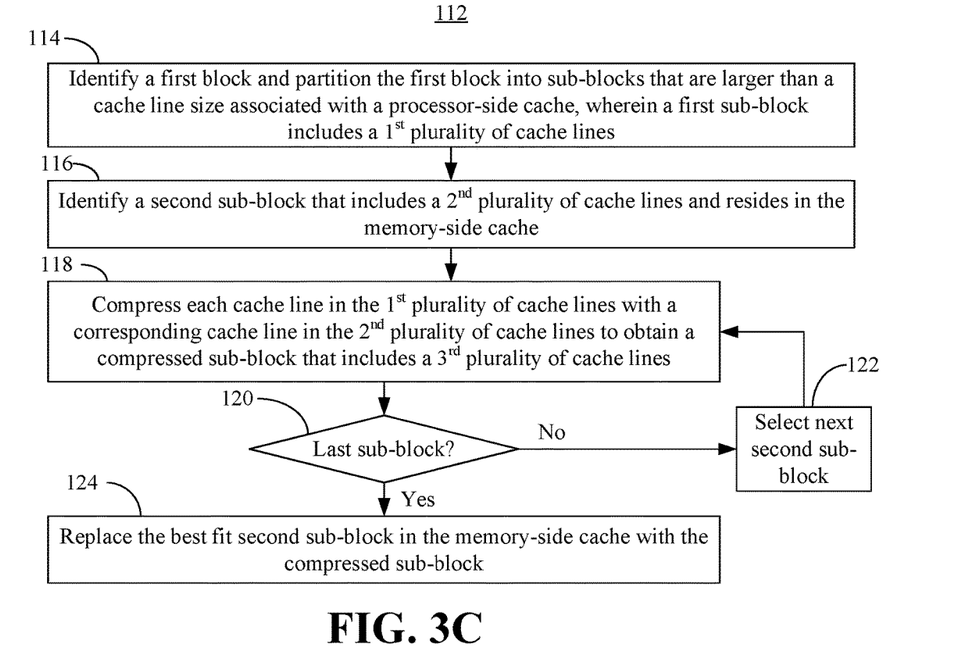

FIG. 3C shows yet another method 112 of partnering memory-side cache sub-blocks. The method 112 may generally be implemented in a compression-enabled memory apparatus as described herein. More particularly, the method 112 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS, TTL technology, or any combination thereof Illustrated processing block 114 provides for identifying a first block and partitioning the first block into sub-blocks that are larger than a cache line size associated with a processor-side cache, wherein the fill sub-block includes a first plurality of cache lines. Thus, processing block 114 might include, for example, partitioning a 4 kB block of data into four 1 kB sub-blocks of data, as already discussed. A partner sub-block may be identified at processing block 116, wherein the partner sub-block includes a second plurality of cache lines and resides in a memory-side cache. Identification of the partner sub-block may include selecting a "candidate" from a given set in the memory-side cache (e.g., if the memory-side cache is a multi-way set associative cache, with each set containing multiple ways and each way containing a block of data).

Each cache line in the first plurality of cache lines may be compressed at processing block 118 with a corresponding cache line in the second plurality of cache lines to obtain a compressed sub-block that includes a third plurality of cache lines. Processing block 118 may include, for example, applying one or more compression procedures to the fill sub-block and to the partner sub-block, and then combining the results on a cache line-by-cache line basis.

Illustrated processing block 120 determines whether the last sub-block (e.g., final sub-block in the set) has been reached in the memory-side cache. If not, the next candidate partner sub-block may be selected at processing block 122 and the illustrated method 112 returns to processing block 118. Once it is determined at processing block 120 that the last sub-block has been reached, processing block 124 may replace the best fit partner sub-block in the memory-side cache with the corresponding compressed sub-block. The best fit partner sub-block may be considered the sub-block that causes the compression sub-block to leave the least amount of unused space in the memory-side cache.

Figure 4:
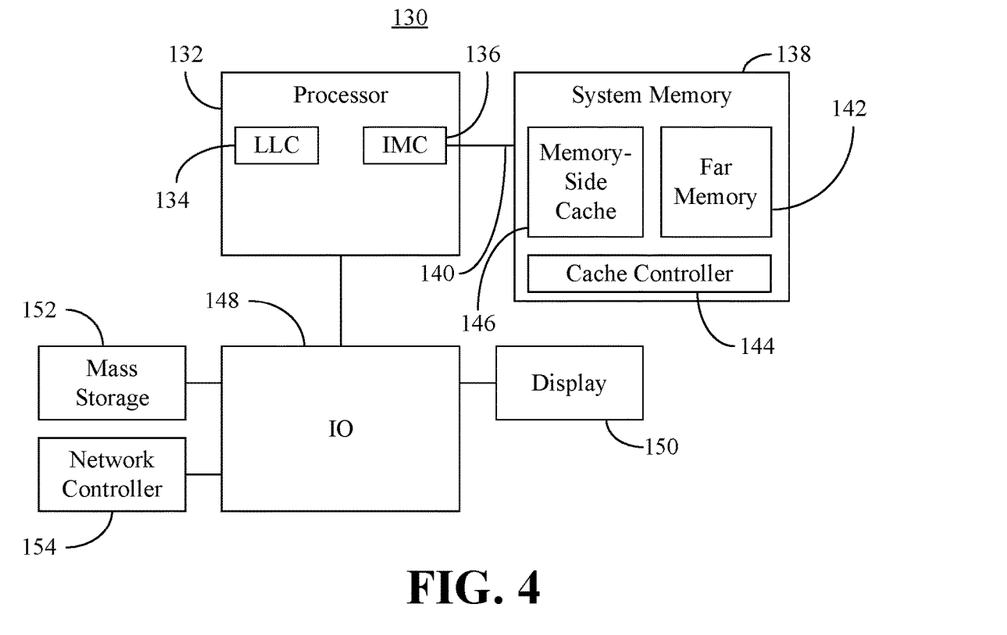
FIG. 4 is a block diagram of an example of a computing system according to an embodiment.

Turning now to FIG. 4, a memory-based computing system 130 is shown. The system 130 may generally be part of a server, desktop computer, notebook computer, tablet computer, convertible tablet, smart television (TV), personal digital assistant (PDA), mobile Internet device (MID), smart phone, wearable device, media player, etc., or any combination thereof In the illustrated example, an input/output (IO) module 148 is communicatively coupled to a display 150 (e.g., liquid crystal display/LCD, light emitting diode/LED display, touch screen), mass storage 152 (e.g., hard disk drive/HDD, optical disk, solid state drive/SSD, flash memory) and a network controller 154 (e.g., wired, wireless). The illustrated system 130 may also include a host processor 132 (e.g., central processing unit/CPU) that includes a processor-side cache 134 (e.g., LLC) and an integrated memory controller 136 that communicates with a system memory 138 over a bus 140 or other suitable communication interface. The host processor 132 and the IO module 148 may be integrated onto a shared semiconductor die (not shown) in a system on chip (SoC) architecture.

Figure 5:
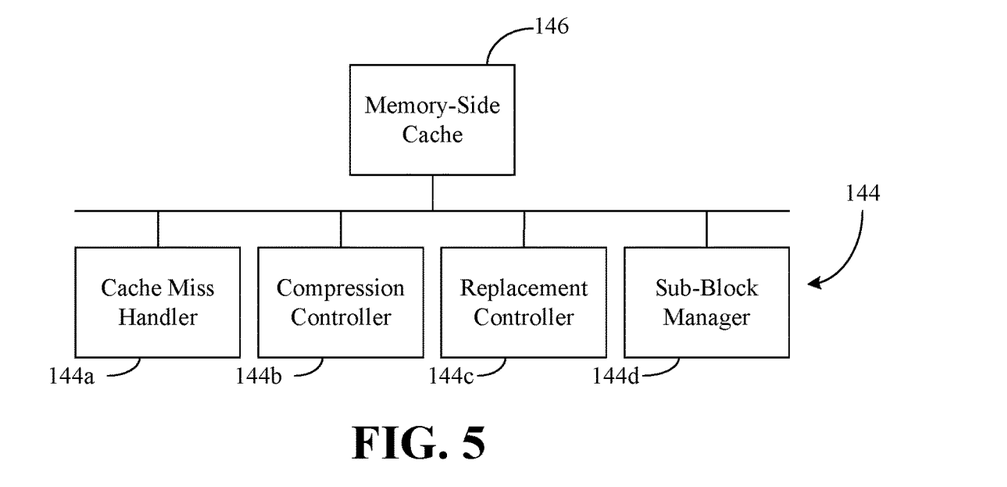
FIG. 5 is a block diagram of an example of a compression-enabled memory apparatus according to an embodiment.

With continuing reference to FIGS. 4 and 5, the system memory 138 may include a memory 142 (e.g., far memory that may be either volatile memory or non-volatile memory), a cache controller 144 (144a-144d) and a memory-side cache 146 that may be accessed more quickly than the memory 142. The memory-side cache 146 may be organized into a plurality of blocks (or sub-blocks). The illustrated cache controller 144 may generally implement one or more aspects of the method 40 (FIG. 2A), the method 52 (FIG. 2B), the method 68 (FIG. 2C), the method 80 (FIG. 3A), the method 94 (FIG. 3B) and/or the method 112 (FIG. 3C), already discussed. Thus, the cache controller 144 may function as a compression-enabled memory apparatus that includes a cache miss handler 144a to identify (e.g., in response to a cache miss) a first block, wherein the first block includes a first plurality of cache lines. For example, the first block might be retrieved and/or received from the far memory 142. Additionally, a compression controller 144b may be communicatively coupled to the cache miss handler 144a. The compression controller 144b may identify a second block that includes a second plurality of cache lines and resides in the memory-side cache 146. In one example, the compression controller 144b further compresses each cache line in the first plurality of cache lines with a corresponding cache line in the second plurality of cache lines to obtain a compressed block that includes a third plurality of cache lines.

In addition, a replacement controller 144c may be communicatively coupled to the cache miss handler 144a and the compression controller 144b, wherein the replacement controller 144c is configured to replace the second block in the memory-side cache 146 with the compressed block if the compressed block satisfies a size condition. The size condition may include, for example, each cache line in the third plurality of cache lines having a size that is less than or equal to a cache line size associated with the processor-side cache 134. The cache controller 144 may also include a sub-block manager 144d to partition the first block into sub-blocks that are larger than the cache line size. In such a case, the compression controller 144b may identify the second block on a sub-block basis.

In one example, the memory-side cache 146 may be referred to as "near memory" in a two level memory/2LM architecture. As already noted, the memory 142 may be far memory that includes either volatile memory or non-volatile memory. Non-volatile memory is a storage medium that does not require power to maintain the state of data stored by the medium. Non-limiting examples of non-volatile memory may include any or a combination of: solid state memory (such as planar or 3D NAND flash memory or NOR flash memory), 3D crosspoint memory, storage devices that use chalcogenide phase change material (e.g., chalcogenide glass), byte addressable non-volatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices 106 that implement such standards may be referred to as DDR-based interfaces.

Additional Notes and Examples

Example 1 may include a compression-enabled memory apparatus comprising a memory-side cache to be organized into a plurality of blocks, a cache miss handler to identify a first block in response to a cache miss in the memory-side cache, a sub-block manager to petition the first block into sub-blocks that are larger than a cache line size associated with a processor-side cache, wherein a fill sub-block is to include a first plurality of cache lines, a compression controller communicatively coupled to the cache miss handler, the compression controller to identify a partner sub-block that includes a second plurality of cache lines and resides in the memory-side cache, the compression controller to further compress each cache line in the first plurality of cache lines with a corresponding cache line in the second plurality of cache lines to obtain a compressed sub-block that includes a third plurality of cache lines, and a replacement controller communicatively coupled to the cache miss handler, the replacement controller to replace the partner sub-block in the memory-side cache with the compressed sub-block if the compressed sub-block satisfies a size condition, wherein the size condition is to include each cache line in the third plurality of cache lines having a size that is less than or equal to the cache line size associated with the processor-side cache.

Example 2 may include the apparatus of Example 1, wherein a victim sub-block is to be selected as the partner sub-block and the replacement controller is to replace the victim sub-block with the fill sub-block if the compressed sub-block does not satisfy the size condition.

Example 3 may include the apparatus of Example 1, wherein a first sub-block in the memory-side cache to cause the compression sub-block to satisfy the size condition is to be selected as the partner sub-block.

Example 4 may include the apparatus of Example 1, wherein a sub-block in the memory-side cache that causes the compression sub-block to leave a least amount of unused space is to be selected as the partner sub-block.

Example 5 may include a memory-based computing system comprising a processor including a processor-side cache, a bus coupled to the processor, and a system memory coupled to the bus, the system memory including a memory, a memory-side cache to be organized into a plurality of blocks, a cache miss handler to identify a first block, wherein the first block is to include a first plurality of cache lines, a compression controller communicatively coupled to the cache miss handler, the compression controller to identify a second block that includes a second plurality of cache lines and resides in the memory-side cache, the compression controller to further compress each cache line in the first plurality of cache lines with a corresponding cache line in the second plurality of cache lines to obtain a compressed block that includes a third plurality of cache lines, and a replacement controller communicatively coupled to the cache miss handler, the replacement controller to replace the second block in the memory-side cache with the compressed block if the compressed block satisfies a size condition.

Example 6 may include the system of Example 5, wherein the size condition is to include each cache line in the third plurality of cache lines having a size that is less than or equal to a cache line size associated with the processor-side cache.

Example 7 may include the system of Example 5, wherein a victim block is to be selected as the second block and the replacement controller is to replace the victim block with the first block if the compressed block does not satisfy the size condition.

Example 8 may include the system of Example 5, wherein a first block in the memory-side cache to cause the compression block to satisfy the size condition is to be selected as the second block.

Example 9 may include the system of Example 5, wherein a block in the memory-side cache that causes the compression block to leave a least amount of unused space is to be selected as the second block.

Example 10 may include the system of any one of Examples 5 to 9, wherein the system memory further includes a sub-block manager to partition the first block into sub-blocks that are larger than a cache line size associated with a processor-side cache, wherein the second block is to be identified on a sub-block basis.

Example 11 may include the system of any one of Examples 5 to 9, wherein the first block is to be identified in response to a cache miss in the memory-side cache.

Example 12 may include a compression-enabled memory apparatus comprising a memory-side cache to be organized into a plurality of blocks, a cache miss handler to identify a first block, wherein the first block is to include a first plurality of cache lines, a compression controller communicatively coupled to the cache miss handler, the compression controller to identify a second block that includes a second plurality of cache lines and resides in the memory-side cache, the compression controller to further compress each cache line in the first plurality of cache lines with a corresponding cache line in the second plurality of cache lines to obtain a compressed block that includes a third plurality of cache lines, and a replacement controller communicatively coupled to the cache miss handler, the replacement controller to replace the second block in the memory-side cache with the compressed block if the compressed block satisfies a size condition.

Example 13 may include the apparatus of Example 12, wherein the size condition is to include each cache line in the third plurality of cache lines having a size that is less than or equal to a cache line size associated with a processor-side cache.

Example 14 may include the apparatus of Example 12, wherein a victim block is to be selected as the second block and the replacement controller is to replace the victim block with the first block if the compressed block does not satisfy the size condition.

Example 15 may include the apparatus of Example 12, wherein a first block in the memory-side cache to cause the compression block to satisfy the size condition is to be selected as the second block.

Example 16 may include the apparatus of Example 12, wherein a block in the memory-side cache that causes the compression block to leave a least amount of unused space is to be selected as the second block.

Example 17 may include the apparatus of any one of Examples 12 to 16, further including a sub-block manager to partition the first block into sub-blocks that are larger than a cache line size associated with a processor-side cache, wherein the second block is to be identified on a sub-block basis.

Example 18 may include the apparatus of any one of Examples 12 to 16, wherein the first block is to be identified in response to a cache miss in the memory-side cache.

Example 19 may include a method of operating a compression-enabled memory apparatus comprising identifying a first block and a second block, wherein the first block includes a first plurality of cache lines, the second block includes a second plurality of cache lines, and the second block resides in a memory-side cache, compressing each cache line in the first plurality of cache lines with a corresponding cache line in the second plurality of cache lines to obtain a compressed block that includes a third plurality of cache lines, and replacing the second block in the memory-side cache with the compressed block if the compressed block satisfies a size condition.

Example 20 may include the method of Example 19, wherein the size condition includes each cache line in the third plurality of cache lines having a size that is less than or equal to a cache line size associated with a processor-side cache.

Example 21 may include the method of Example 19, wherein the victim block is selected as the second block and the method further includes replacing the victim block with the first block if the compressed block does not satisfy the size condition.

Example 22 may include the method of Example 19, wherein a first block in the memory-side cache to cause the compression block to satisfy the size condition is selected as the second block.

Example 23 may include the method of Example 19, wherein a block in the memory-side cache that causes the compression block to leave a least amount of unused space is selected as the second block.

Example 24 may include the method of any one of Examples 19 to 23, further including partitioning the first block into sub-blocks that are larger than a cache line size associated with a processor-side cache, wherein the second block is identified on a sub-block basis.

Example 25 may include the method of any one of Examples 19 to 23, wherein the first block is identified in response to a cache miss in the memory-side cache.

Example 26 may include a compression-enabled memory apparatus comprising means for identifying a first block and a second block, wherein the first block is to include a first plurality of cache lines, the second block is to include a second plurality of cache lines, and the second block is to reside in a memory-side cache, means for compressing each cache line in the first plurality of cache lines with a corresponding cache line in the second plurality of cache lines to obtain a compressed block that includes a third plurality of cache lines, and means for replacing the second block in the memory-side cache with the compressed block if the compressed block satisfies a size condition.

Example 27 may include the apparatus of Example 26, wherein the size condition is to include each cache line in the third plurality of cache lines having a size that is less than or equal to a cache line size associated with a processor-side cache.

Example 28 may include the apparatus of Example 26, wherein the victim block is to be selected as the second block and the apparatus further includes means for replacing the victim block with the first block if the compressed block does not satisfy the size condition.

Example 29 may include the apparatus of Example 26, wherein a first block in the memory-side cache to cause the compression block to satisfy the size condition is to be selected as the second block.

Example 30 may include the apparatus of Example 26, wherein a block in the memory-side cache that causes the compression block to leave a least amount of unused space is to be selected as the second block.

Example 31 may include the apparatus of any one of Examples 26 to 30, further including means for partitioning the first block into sub-blocks that are larger than a cache line size associated with a processor-side cache, wherein the second block is to be identified on a sub-block basis.

Example 32 may include the apparatus of any one of Examples 26 to 30, wherein the first block is to be identified in response to a cache miss in the memory-side cache.

Techniques described herein may therefore increase cache capacity and reduce cache miss-related accesses to far memory, which may in turn improve performance and reduce power consumption. Additionally, techniques may reduce decompression latency and overhead in critical paths of CPU read operations. Accordingly, performance may be further enhanced. Moreover, memory-side cache compression may reduce system cost by enabling smaller caches to be built, while bridging the gap to larger caches using compression. The techniques may also be extended to different block/cache line granularities and associativities.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   a memory-side cache to be organized into a plurality of blocks;
   a cache miss handler to identify a first block in response to a cache miss in the memory-side cache;
   a sub-block manager to partition the first block into sub-blocks that are larger than a cache line size associated with a processor-side cache, wherein a fill sub-block is to include a first plurality of cache lines;
   a compression controller communicatively coupled to the cache miss handler, the compression controller to identify a partner sub-block that includes a second plurality of cache lines and resides in the memory-side cache, the compression controller to further compress each cache line in the first plurality of cache lines with a corresponding cache line in the second plurality of cache lines to obtain a compressed sub-block that includes a third plurality of cache lines; and
   a replacement controller communicatively coupled to the cache miss handler, the replacement controller to replace the partner sub-block in the memory-side cache with the compressed sub-block if the compressed sub-block satisfies a size condition, wherein the size condition is to include each cache line in the third plurality of cache lines having a size that is less than or equal to the cache line size associated with the processor-side cache.

2. The apparatus of claim 1, wherein a victim sub-block is to be selected as the second sub-block and the replacement controller is to replace the victim sub-block with the fill sub-block if the compressed sub-block does not satisfy the size condition.

3. The apparatus of claim 1, wherein a first sub-block in the memory-side cache to cause the compression sub-block to satisfy the size condition is to be selected as the partner sub-block.

4. The apparatus of claim 1, wherein a sub-block in the memory-side cache that causes the compression sub-block to leave a least amount of unused space is to be selected as the partner sub-block.

5. A system comprising:
   a processor including a processor-side cache;
   a bus coupled to the processor; and
   a system memory coupled to the bus, the system memory including:
      a memory,
      a memory-side cache to be organized into a plurality of blocks,
      a cache miss handler to identify a first block, wherein the first block is to include a first plurality of cache lines,
      a compression controller communicatively coupled to the cache miss handler, the compression controller to identify a second block that includes a second plurality of cache lines and resides in the memory-side cache, the compression controller to further compress each cache line in the first plurality of cache lines with a corresponding cache line in the second plurality of cache lines to obtain a compressed block that includes a third plurality of cache lines, and
      a replacement controller communicatively coupled to the cache miss handler, the replacement controller to replace the second block in the memory-side cache with the compressed block if the compressed block satisfies a size condition.

6. The system of claim 5, wherein the size condition is to include each cache line in the third plurality of cache lines having a size that is less than or equal to a cache line size associated with the processor-side cache.

7. The system of claim 5, wherein a victim block is to be selected as the second block and the replacement controller is to replace the victim block with the first block if the compressed block does not satisfy the size condition.

8. The system of claim 5, wherein a first block in the memory-side cache to cause the compression block to satisfy the size condition is to be selected as the second block.

9. The system of claim 5, wherein a block in the memory-side cache that causes the compression block to leave a least amount of unused space is to be selected as the second block.

10. The system of claim 5, wherein the system memory further includes a sub-block manager to partition the first block into sub-blocks that are larger than a cache line size associated with a processor-side cache, wherein the second block is to be identified on a sub-block basis.

11. The system of claim 5, wherein the first block is to be identified in response to a cache miss in the memory-side cache.

12. An apparatus comprising:
    a memory-side cache to be organized into a plurality of blocks;
    a cache miss handler to identify a first block, wherein the first block is to include a first plurality of cache lines;
    a compression controller communicatively coupled to the cache miss handler, the compression controller to identify a second block that includes a second plurality of cache lines and resides in the memory-side cache, the compression controller to further compress each cache line in the first plurality of cache lines with a corresponding cache line in the second plurality of cache lines to obtain a compressed block that includes a third plurality of cache lines; and
    a replacement controller communicatively coupled to the cache miss handler, the replacement controller to replace the second block in the memory-side cache with the compressed block if the compressed block satisfies a size condition.

13. The apparatus of claim 12, wherein the size condition is to include each cache line in the third plurality of cache lines having a size that is less than or equal to a cache line size associated with a processor-side cache.

14. The apparatus of claim 12, wherein a victim block is to be selected as the second block and the replacement controller is to replace the victim block with the first block if the compressed block does not satisfy the size condition.

15. The apparatus of claim 12, wherein a first block in the memory-side cache to cause the compression block to satisfy the size condition is to be selected as the second block.

16. The apparatus of claim 12, wherein a block in the memory-side cache that causes the compression block to leave a least amount of unused space is to be selected as the second block.

17. The apparatus of claim 12, further including a sub-block manager to partition the first block into sub-blocks that are larger than a cache line size associated with a processor-side cache, wherein the second block is to be identified on a sub-block basis.

18. The apparatus of claim 12, wherein the first block is to be identified in response to a cache miss in the memory-side cache.

19. A method comprising:
   identifying a first block and a second block, wherein the first block includes a first plurality of cache lines, the second block includes a second plurality of cache lines, and the second block resides in a memory-side cache;
   compressing each cache line in the first plurality of cache lines with a corresponding cache line in the second plurality of cache lines to obtain a compressed block that includes a third plurality of cache lines; and
   replacing the second block in the memory-side cache with the compressed block if the compressed block satisfies a size condition.

20. The method of claim 19, wherein the size condition includes each cache line in the third plurality of cache lines having a size that is less than or equal to a cache line size associated with a processor-side cache.

21. The method of claim 19, wherein the victim block is selected as the second block and the method further includes replacing the victim block with the first block if the compressed block does not satisfy the size condition.

22. The method of claim 19, wherein a first block in the memory-side cache to cause the compression block to satisfy the size condition is selected as the second block.

23. The method of claim 19, wherein a block in the memory-side cache that causes the compression block to leave a least amount of unused space is selected as the second block.

24. The method of claim 19, further including partitioning the first block into sub-blocks that are larger than a cache line size associated with a processor-side cache, wherein the second block is identified on a sub-block basis.

25. The method of claim 19, wherein the first block is identified in response to a cache miss in the memory-side cache.

\* \* \* \* \*